United States Patent Office.

BENNO HOMOLKA, OF HÖCHST-ON-THE-MAIN, GERMANY, ASSIGNOR TO THE FARBWERKE, VORMALS MEISTER, LUCIUS & BRÜNING, OF SAME PLACE.

INDULINE DYE.

SPECIFICATION forming part of Letters Patent No. 458,281, dated August 25, 1891.

Application filed October 13, 1890. Serial No. 367,983. (Specimens.) Patented in England November 10, 1888, No. 16,325.

*To all whom it may concern:*

Be it known that I, BENNO HOMOLKA, doctor of philosophy, a citizen of the Empire of Austria, residing at Höchst-on-the-Main, in the Empire of Germany, have invented certain new and useful Improvements in the Production of Coloring-Matter of the Induline Series Soluble in Water, (for which I have obtained Letters Patent in England November 10, 1888, No. 16,325;) and I do hereby declare the following to be a full, clear, and exact description of the invention, such as will enable others skilled in the art to which it appertains to make and use the same.

When there is heated a mixture of amido-azo-benzole, aniline, and hydrochlorate of aniline, there is produced, as is well known, in the first stage, at temperatures between 80° and 100° centigrade, the azophenine $C_{30}H_{24}N_4$, and when the temperature is raised farther a series of basic coloring-matters giving shades varying from violet to blue and being more or less soluble or even insoluble in alcohol. These coloring-matters are known by the generic name "indulines." If the temperature is not raised above 130° to 150° centigrade and the heating continued only up to the point that the azophenine produced in the first stage has disappeared again entirely, (which is ascertained by dissolving small samples of the melt in alcohol, in which solvent the azophenine does not dissolve at all,) there are obtained no other coloring-matters than such as are soluble in alcohol—that is to say, a mixture of the two indulines $C_{24}H_{18}N_4HCl$ and $C_{18}H_{15}N_3HCl$. This mixture of indulines soluble in alcohol is of great value for cotton-dyeing and printing purposes; but its general employment is impeded because only one portion of the same—the induline $C_{24}H_{18}N_4$—is soluble in water.

I have discovered now that this mixture of indulines soluble in alcohol can be converted into blue basic coloring-matter of easy solubility in water by heating it, together with paraphenylene-diamine, to from 150° to 180° centigrade.

The production of this blue coloring-matter is carried out in the following way: The mixture of the indulines soluble in alcohol is produced in manner described in Letters Patent No. 418,916, dated January 7, 1890. In an enameled vessel furnished with a wooden agitator one hundred and fifty parts, by weight, of paraphenylene-diamine are melted, and thereto added slowly a mixture of one hundred parts, by weight, of the induline soluble in alcohol and twenty-two parts, by weight, of hydrochlorate of paraphenylene-diamine. By the addition of about one per cent. of benzoic acid the reaction will be quickened; but this addition is not absolutely necessary. According to the shade of coloring-matter desired it is heated to a temperature between 150° and 180° centigrade until a sample of the melt dissolves in diluted hydrochloric acid completely. The shade of the coloring-matter will become more grayish in accordance with increase of temperature above 150° centigrade. The melt is to be boiled immediately after being finished in five hundred parts, by weight, of water, whereby the portion of the paraphenylene-diamine not used up is separated. This portion can be recuperated. The coloring-base of the new coloring-matter that remains is dissolved in diluted hydrochloric acid, the solution filtered, and the coloring-matter precipitated by means of common salt and zinc chloride.

The new coloring-matter, a zinc chloride double salt, presents itself in the form of a brown powder with metallic luster, insoluble in ether, benzole, and chloroform, somewhat soluble in alcohol, and of very easy solubility in water, showing violet-blue coloration. By alkalies the coloring-base is precipitated from the aqueous solution in the form of a violet precipitate, in alcohol easily soluble with blue-violet coloration, and in ether scarcely soluble with red-violet coloration. In cold concentrated sulphuric acid the coloring-matter dissolves easily, showing the violet-blue coloration of the aqueous solution, and this coloration is not altered even when the solution is heated to 100° centigrade. In concentrated hydrochloric acid the coloring-matter is of very difficult solubility, showing the same coloration. Hydrochloric acid precipitates it from its aqueous solution even on being largely diluted. Oxidation agents—such as chromic acid, ferric chloride, permanganic acid—produce black precipitates in the aqueous solutions of the coloring-matter. Tanned as well as unmordanted cotton the coloring-matter dyes blue-violet to blue shades resisting washing and the influence of light very well.

What I claim as my invention, and wish to secure by Letters Patent, is—

1. The process herein described for producing coloring-matter of the induline series, which consists in heating the mixture of soluble indulines together with paraphenylene-diamine and hydrochlorate of paraphenyl-diamine, and after filtering precipitating by means of common salt and zinc chloride, substantially as specified.

2. As a new article of manufacture, the blue coloring-matter of the induline series, a zinc chloride double salt presenting itself in the form of a brown powder with metallic luster insoluble in ether, benzole, and chloroform, somewhat soluble in alcohol, of very easy solubility in water, showing violet-blue coloration, nearly insoluble in hydrochloric acid, but soluble in cold sulphuric acid, and is precipitated by alkalies and oxidizing agents from aqueous solutions, as specified.

In testimony whereof I affix my signature in presence of two witnesses.

BENNO HOMOLKA.

Witnesses:
JOSEF REVERDY,
HEINRICH HAHN.